Patented July 14, 1925.

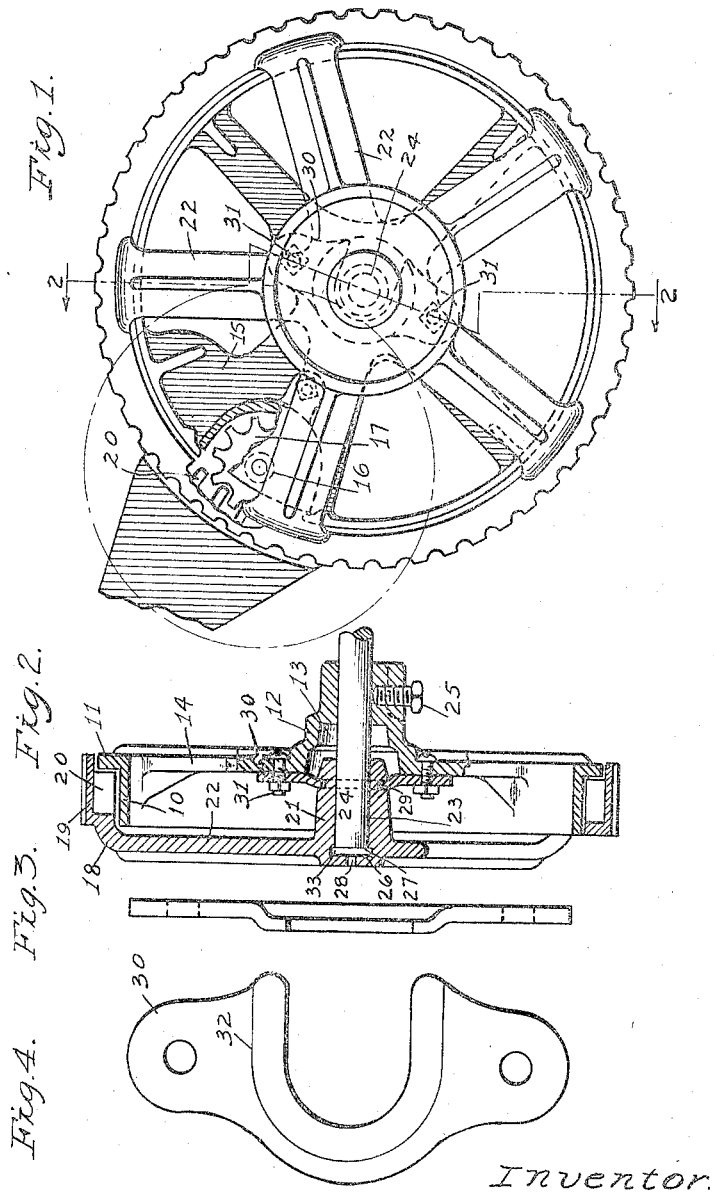

1,545,829

UNITED STATES PATENT OFFICE.

PAUL E. HERSCHEL, JR., OF PEORIA, ILLINOIS.

WHEEL.

Application filed September 17, 1923. Serial No. 663,186.

*To all whom it may concern:*

Be it known that PAUL E. HERSCHEL, Jr., a citizen of the United States of America, residing at Peoria, in the county of Peoria and State of Illinois, has invented certain new and useful Improvements in Wheels, of which the following is a specification.

The object of my invention is to provide a wheel especially adapted for mounting in connection with the axle and framing of a lawn-mower and having a hub or centering portion, the bored portion of which is closed at its outer end except for a small opening to provide for the introduction of a lubricant, and the proportioning and fashioning of a flanged portion of the wheel to over-lie the marginal edge of a circular framing portion, in conjunction with which, the wheel is mounted, whereby thru such construction, the hub bearing and peripheral conjunction with the framing, is so closed as to be effective protection from dust or other foreign substances.

Another object of my invention relates to a fastening means of the wheel to the framing whereby the outer wall of the wheel hub, thru which the perforation is entered, will be relatively spaced from the end of the axle which is fixed to the frame to provide a clearance opening there-between, to form in conjunction with a peripheral expansion of such opening beyond the normal diameter of the bore in the hub, an oil pocket.

Another feature of the invention resides in the fashioning of a sheet metal wheel fastening plate on relative off-set lines for lateral strengthening.

Referring to the accompanying drawings:—

Figure 1 is a front elevation of a wheel included in my invention.

Figure 2 is a section on 2—2 of Figure 1.

Figure 3 is a detailed edge view of a preferred form of a device for retaining the wheel upon the end of the axle, and Figure 4 is a detailed plan view of the same subject matter as disclosed in Figure 3.

In the drawings a framing is shown which constitutes a part of the lawn-mower structure and in such framing, 10 refers to a circular rim member provided with flange 11; 12 is a centrally disposed body portion with a centrally disposed bore therein and with a clearance opening 13; 14 is radially disposed arm members connecting rim member 10 with said body portion 12; and 15 is a frame extension adapted to supporting more parts (not shown). 16 is a cutter blade shaft and 17 is a gear fixed thereto adapted to co-operate with gear members on a wheel hereinafter to be described.

18 refers generally to a wheel comprising a peripheral flange 19 adapted when the wheel is properly positioned with respect to rim member 10 to over-lie said rim member 10 and also the upper edge of flange 11 thereof, said flange 19 being provided with internally disposed cog teeth 20 adapted to mesh with cog wheel 17. Said wheel also includes in its structure, a hub portion 21 which is connected with peripheral flange 19 by means of spoke members 22.

Referring particularly to the hub member, 23 indicates a central bore therein in alignment with the central bore in body portion 12 of the framing within which shaft member 24 fixed to the body portion of the framing by means of set screw 25 is adapted to be entered as shown in Fig. 2. Adjacent the closure portion 26, the bore in the hub is provided with a clearance opening 27 adapted to serve as a receptacle or pocket for oil. An opening 28 is provided in closure portion 26 registering substantially and centrally with the axis of shaft 24.

In my improved lawn-mower structure, I am aiming to secure a simple form of attachment of wheels to the framing that will relate the parts in a manner to produce the minimum of friction in the operation of the machine. To this end I have merely provided a groove 29 within the exterior surface of hub 21 and an attachment member 30 adapted to register with said groove, said attachment member being fixed to the framing by means of bolts as 31. While any form of attachment member may be employed as a fastening means for the wheel, nevertheless I prefer the form I herein disclose which consists of a sheet metal plate provided with a centrally disposed U fashioned inseat, proportioned and shaped for substantial close entry within the hub groove and over-lying the hub to the minimum of contact engagement whereby friction between the parts may be reduced to a minimum. The metal of the attachment member is also offset as at 32 for the purpose of reinforcement against lateral strain.

In arranging the wheel with respect to the framing and the shaft 24, the hub is designed to be entered upon the shaft until the end portion of the latter is in alignment with the inner wall projections 33 of the clearance opening 27 whereby a clearance space is left between the end of the shaft and the inner wall of the closure portion 26 of the wheel. This spacing is effected thru the proper placing of the groove 29 upon the hub with respect to the position of the attachment member 30. In this position also, the flange 19 will be brought to over-lie the rim member 10 as well as the flange portion 11 thereof and in such a relationship as to effect complete closure but at the same time provide clearance there-between so as to avoid friction.

The provisions in my improvement for making the sole bearing between the wheel and the frame is a union juncture of the grooves in the hubs with the attachment members to serve to reduce friction, and the placing of the only frictional bearing in such a covered position as to prevent the entry of foreign substances thereto, and the spacing of the end of the shaft member on the wheel wall, and the fashioning of the said wheel wall to form an oil pocket adjacent the end of the shaft which facilitates the housing of a considerable quantity of lubricant and is positioned with respect to the shaft so that the centrifugal action of the wheel will not dislodge the lubricant. It is to these particular features and to the point of relationing the rim and flange members respectively of the framing and the wheel to avoid friction and dislodgement, that my invention is especially directed.

Having thus described my invention, what I claim as new and desire to secure by Letters Patent of the United States is:

1. In apparatus of the class described, a frame member, a shaft fixed thereto, a wheel element, a hub having a bore therein for receiving the end of the shaft and having an aperture entry to the bore, a groove circumferentially of the hub, its lateral walls serving as a thrust bearing for maintaining the wheel in proper working relation with respect to the frame and the shaft, and a yoke member attached to the frame having a running relation with the hub groove and a bearing relation with its side walls, including a relationing of the frame to the hub and the shaft to the frame, to provide relative spacing of the end of the shaft from the end wall of the bore in the hub to prevent relative contact and to provide an oil chamber within the said bore.

2. A device of the character described having in combination, a wheel frame, a peripheral flange upon said frame, a hub centrally mounted upon the frame having a bore therein for receiving the wheel shaft, means for rigidly securing the frame to the shaft, a wheel element comprising a rim portion adapted to removably and telescopically receive the said flange of the frame member therein, a centrally disposed hub extending inwardly from said wheel element provided with a bore in axial alignment with the bore of the frame member for receiving the end of the wheel shaft therein and having a restricted aperture extending therethrough and communicating with the said bore, the said hub on the wheel element being provided with a peripheral groove therein, means for locking the wheel element and the wheel frame in assembled position, the said means comprising a yoke secured to the frame and adapted to enter the peripheral groove upon the wheel hub, the said yoke and groove being relatively arranged so as to space the end of the shaft from the adjacent end wall of the wheel hub, thereby forming an oil chamber in the outer end of the bore of said hub.

3. In a device of the character described having in combination a wheel frame, a peripheral flange upon said frame, a hub centrally mounted upon the frame having an enlarged recess and a restricted bore therein for receiving the wheel shaft, means for rigidly securing the frame to the wheel shaft, a removable wheel element comprising a rim portion adapted to telescopically receive the flange of the wheel frame, a centrally disposed hub extending inwardly from the wheel element and adapted to enter the enlarged recess in said frame hub, the hub on the wheel element being provided with a restricted aperture communicating with the bore therein, and provided with a peripheral groove on the inner end thereof, means for detachably securing the wheel element to said frame, the said means comprising a yoke secured to the frame and adapted to enter the peripheral groove upon the wheel hub, the yoke and the hub being relatively arranged so as to space the end of the shaft from the end of the hub so as to provide an oil chamber in the outer end of the bore.

In testimony whereof I affix my signature.

PAUL E. HERSCHEL, Jr.